(12) United States Patent
Thomson

(10) Patent No.: US 9,686,902 B2
(45) Date of Patent: Jun. 27, 2017

(54) SYSTEM AND METHOD FOR IMPROVING PERFORMANCE OF AN AGRICULTURAL VEHICLE OR IMPLEMENT

(71) Applicant: CNH America LLC, New Holland, PA (US)

(72) Inventor: James Harmon Thomson, Austin, AR (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/975,929

(22) Filed: Aug. 26, 2013

(65) Prior Publication Data

US 2014/0172247 A1 Jun. 19, 2014

Related U.S. Application Data

(60) Provisional application No. 61/738,452, filed on Dec. 18, 2012.

(51) Int. Cl.
*A01B 63/112* (2006.01)

(52) U.S. Cl.
CPC .................. *A01B 63/112* (2013.01)

(58) Field of Classification Search
CPC ......... A01B 61/00; A01B 67/00; A01B 71/00; A01B 71/02; A01B 71/063; A01B 76/00; A01B 63/112
USPC ............................................ 701/50; 180/900
See application file for complete search history.

(56) References Cited

U.S. PATENT DOCUMENTS

| | | | |
|---|---|---|---|
| 4,838,173 | A | 6/1989 | Schroeder et al. |
| 5,273,347 | A | 12/1993 | Hansson |
| 5,286,094 | A | 2/1994 | Milner |
| 5,295,736 | A | 3/1994 | Brearley |
| 5,441,293 | A | 8/1995 | Sturgess |

(Continued)

FOREIGN PATENT DOCUMENTS

| | | |
|---|---|---|
| EP | 0590992 | 4/1994 |
| EP | 1889531 | 2/2008 |

(Continued)

OTHER PUBLICATIONS

European Search Report for European Application No. 13197082.4 dated Apr. 24, 2014 (5 pages).

*Primary Examiner* — Aaron L Troost

(74) *Attorney, Agent, or Firm* — Rickard K. DeMille; Rebecca L. Henkel

(57) ABSTRACT

One agricultural system includes a hitch assembly configured to couple an agricultural vehicle with an agricultural implement. The agricultural system also includes a sensor coupled to the hitch assembly and configured to provide a signal indicative of a force applied to the hitch assembly by the agricultural vehicle and/or the agricultural implement. The agricultural system includes control circuitry configured to receive the signal from the sensor, to select a parameter associated with operation of the agricultural vehicle and/or the agricultural implement, based on the signal, to determine if performance of the agricultural vehicle and/or the agricultural implement will be improved by adjusting the parameter, and to control the parameter if performance of the agricultural vehicle and/or the agricultural implement will be improved.

11 Claims, 3 Drawing Sheets

(56) References Cited

U.S. PATENT DOCUMENTS

Figure 1:
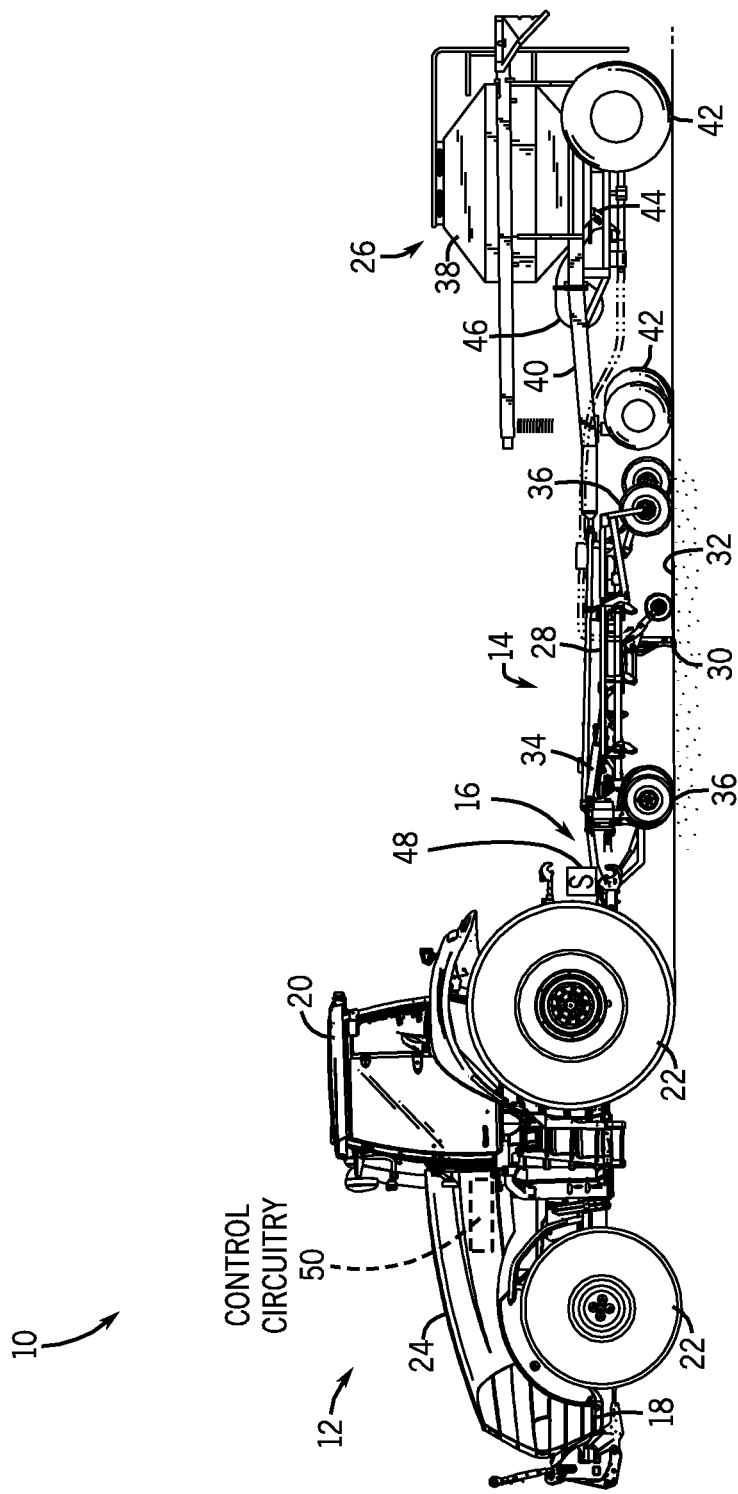

| | | | |
|---|---|---|---|
| 6,144,910 A * | 11/2000 | Scarlett | A01B 63/023 |
| | | | 172/4.5 |
| 7,458,428 B2 | 12/2008 | Laudick et al. | |
| 7,513,521 B2 | 4/2009 | Posselius et al. | |
| 7,899,584 B2 * | 3/2011 | Schricker | 701/1 |
| 2002/0107627 A1 * | 8/2002 | Funke et al. | 701/70 |
| 2008/0257570 A1 * | 10/2008 | Keplinger et al. | 172/9 |

FOREIGN PATENT DOCUMENTS

| | | | | |
|---|---|---|---|---|
| GB | 2244906 A | 12/1991 | | |
| WO | 8705571 | 9/1987 | | |
| WO | 2007/067252 | 6/2007 | | |
| WO | 2013/013917 | 1/2013 | | |
| WO | WO 2013013915 A1 * | 1/2013 | | A01B 63/1145 |

* cited by examiner

SYSTEM AND METHOD FOR IMPROVING PERFORMANCE OF AN AGRICULTURAL VEHICLE OR IMPLEMENT

CROSS REFERENCE TO RELATED APPLICATION

This application claims priority from and the benefit of U.S. Patent Provisional Application Ser. No. 61/738,452, entitled "SYSTEM AND METHOD FOR IMPROVING PERFORMANCE OF AN AGRICULTURAL VEHICLE OR IMPLEMENT", filed Dec. 18, 2012, which is hereby incorporated by reference in its entirety.

BACKGROUND

The invention relates generally to agricultural vehicles, and more particularly to systems and methods for improving performance of an agricultural vehicle and/or an agricultural implement.

Work vehicles, such as agricultural vehicles, may be employed to tow a variety of equipment (e.g., planters, seeders, tillage implements, storage tanks, etc.) through a field. The load placed on a work vehicle that tows equipment may vary based on a number of conditions. For example, a pull force applied by an implement to a work vehicle may be greater when moving the implement uphill, as compared to moving the implement over a flat surface. Moreover, a braking force of a work vehicle may be greater when moving downhill, as compared to moving over a flat surface. As another example, an amount of drag placed on the work vehicle by the equipment may vary based on the weight of the equipment. In some circumstances, such as when the equipment weight changes over time (e.g., via distribution of product within a storage tank), the amount of drag placed on the work vehicle by the equipment may vary during operation of the work vehicle. As a further example, an amount of drag placed on the work vehicle by the equipment may vary based on a depth of ground engaging tools of the equipment.

Changes in the load placed on a work vehicle may cause the work vehicle to operate inefficiently. In addition, variations in the load may place undesirable stress on components of the work vehicle. For example, fuel efficiency may decrease when a greater load is placed on the work vehicle. Therefore, it may be desirable to improve performance of a work vehicle that operates under varying load conditions.

BRIEF DESCRIPTION

In one embodiment, an agricultural system includes a hitch assembly configured to couple an agricultural vehicle with an agricultural implement. The agricultural system also includes a sensor coupled to the hitch assembly and configured to provide a signal indicative of a force applied to the hitch assembly by the agricultural vehicle, the agricultural implement, or some combination thereof. The agricultural system includes control circuitry configured to receive the signal from the sensor, to select a parameter associated with operation of the agricultural vehicle, the agricultural implement, or some combination thereof, based on the signal, to determine if performance of the agricultural vehicle, the agricultural implement, or some combination thereof, will be improved by adjusting the parameter, and to control the parameter if performance of the agricultural vehicle, the agricultural implement, or some combination thereof, will be improved.

In another embodiment, an agricultural system includes an agricultural vehicle having a hitch assembly configured to be coupled to an agricultural implement. The agricultural vehicle also includes a sensor coupled to the hitch assembly and configured to provide a signal indicative of a force applied to the hitch assembly by the agricultural implement. The agricultural vehicle includes control circuitry configured to receive the signal from the sensor. The control circuitry is configured to select a parameter associated with operation of the agricultural vehicle, the agricultural implement, or some combination thereof, based on the signal, to determine if performance of the agricultural vehicle, the agricultural implement, or some combination thereof, will be improved by adjusting the parameter, and to control the parameter if performance of the agricultural vehicle, the agricultural implement, or some combination thereof, will be improved. The parameter includes at least one of a pulling force provided by the agricultural vehicle, and a drag provided by the agricultural implement.

In another embodiment, a method for improving performance of an agricultural vehicle includes sensing a force applied by an agricultural implement to a hitch assembly of the agricultural vehicle using a sensor. The method also includes selecting a parameter associated with operation of the agricultural vehicle, the agricultural implement, or some combination thereof, based on the sensed force and using control circuitry. The method includes determining if performance of the agricultural vehicle, the agricultural implement, or some combination thereof, will be improved by adjusting the parameter using the control circuitry. The method also includes controlling the parameter using the control circuitry if performance of the agricultural vehicle, the agricultural implement, or some combination thereof, will be improved.

DRAWINGS

Figure 2:
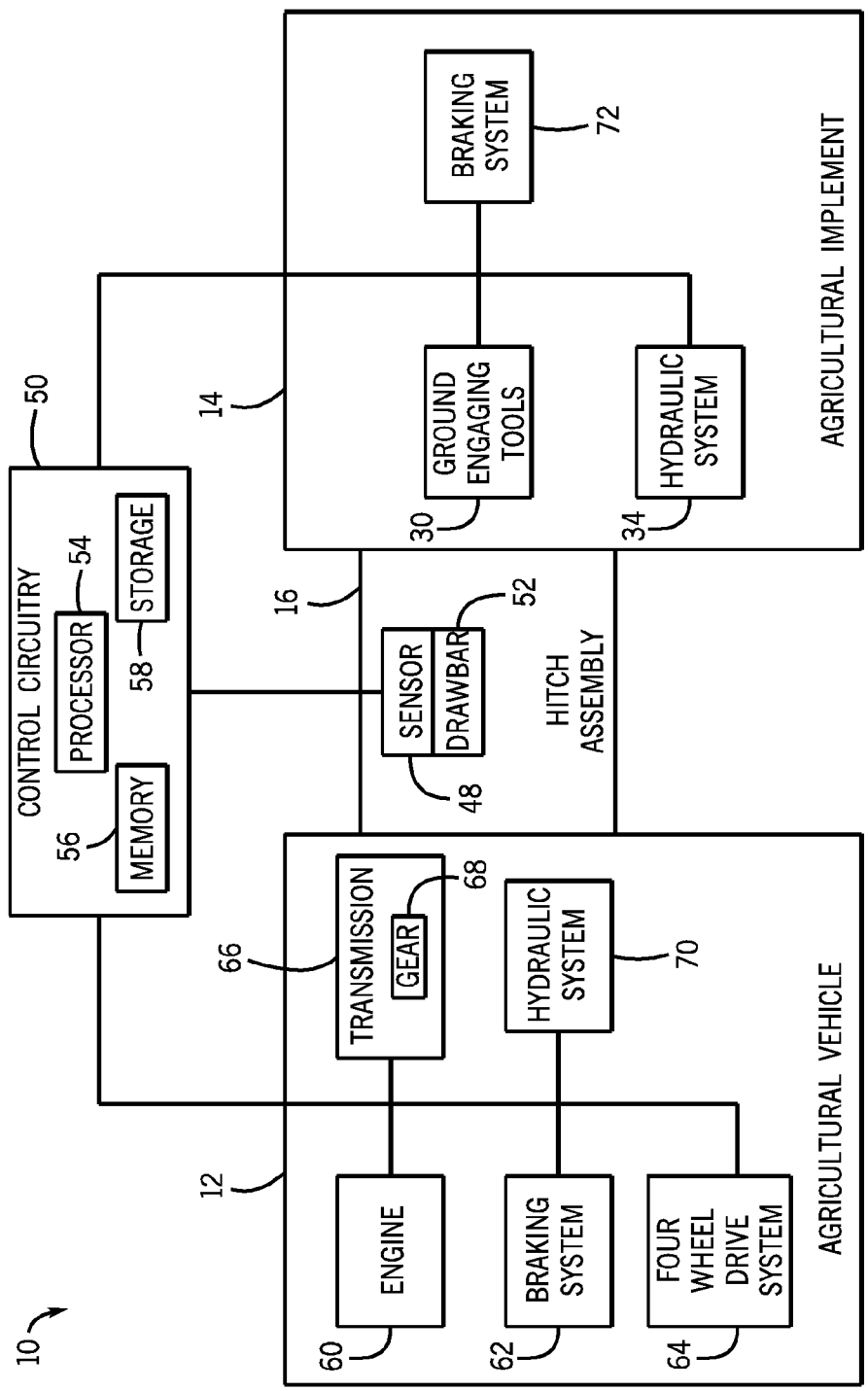
Figure 3:
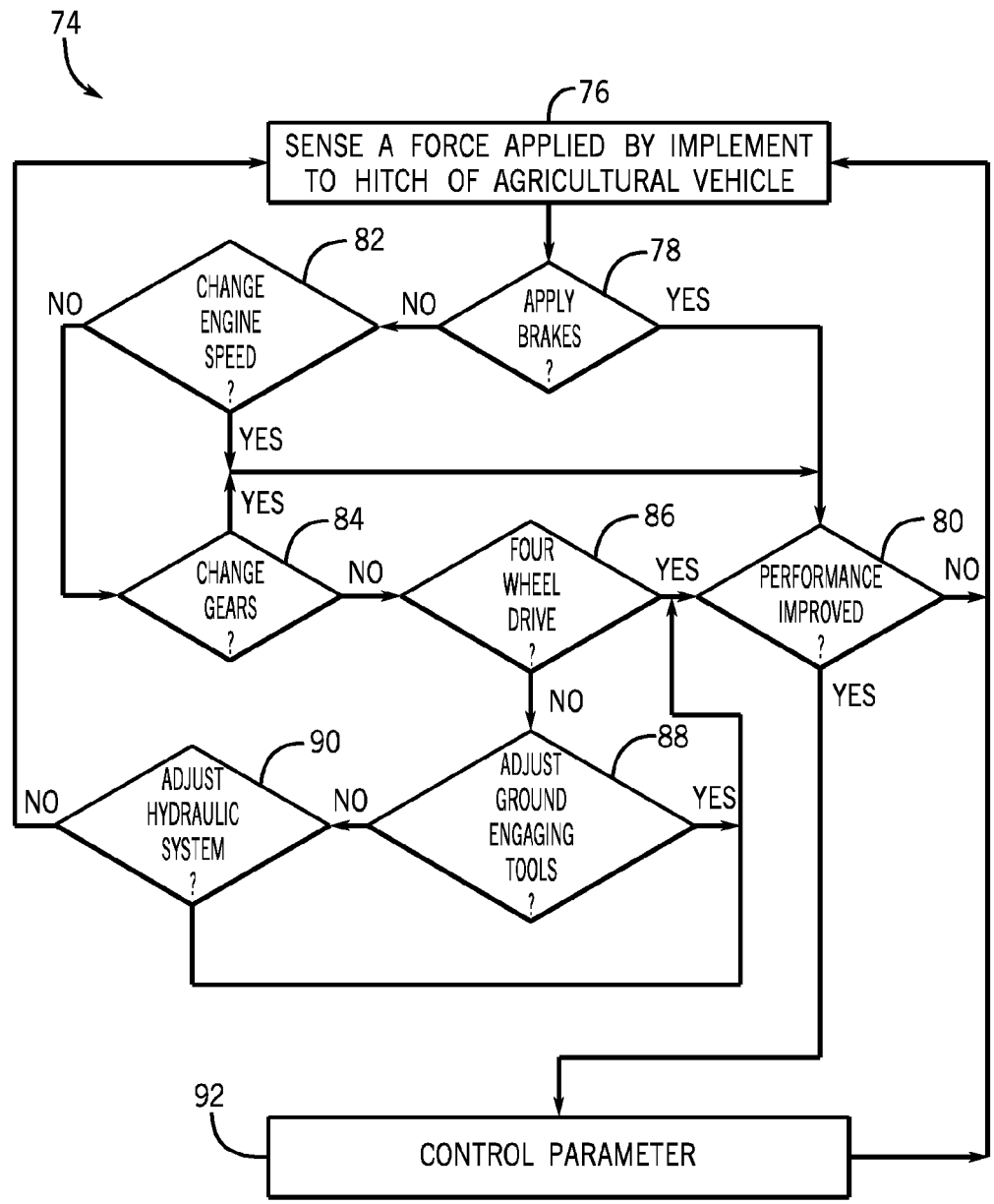

These and other features, aspects, and advantages of the present invention will become better understood when the following detailed description is read with reference to the accompanying drawings in which like characters represent like parts throughout the drawings, wherein:

FIG. 1 is a side view of an embodiment of an agricultural system having control circuitry configured to improve performance of an agricultural vehicle and/or an agricultural implement while the agricultural vehicle is towing the agricultural implement;

FIG. 2 is a block diagram of an embodiment of an agricultural system having control circuitry configured to improve performance of an agricultural vehicle and/or an agricultural implement while the agricultural vehicle is towing the agricultural implement; and FIG. 3 is a flowchart of an embodiment of a method for improving performance of an agricultural vehicle and/or an agricultural implement while the agricultural vehicle is towing the agricultural implement.

DETAILED DESCRIPTION

FIG. 1 is a side view of an embodiment of an agricultural system 10 having control circuitry configured to improve performance of an agricultural vehicle 12 and/or an agricultural implement 14 while the agricultural vehicle 12 is towing the agricultural implement 14. As illustrated, the agricultural vehicle 12 is coupled to the agricultural implement 14 by a hitch assembly 16. As may be appreciated, the hitch assembly 16 may be a hitch of the agricultural vehicle 12 and/or a hitch of the agricultural implement 14. The agricultural vehicle 12 includes a frame 18 configured to support a cab 20, wheels 22, a hood 24, and various other components of the agricultural vehicle 12. The cab 20 provides an enclosed space for an operator, and the hood 24 houses the engine and/or other systems configured to facilitate operation of the agricultural vehicle 12 (e.g., control systems, transmission systems, hydraulic systems, pneumatic systems, electrical systems, mechanical systems, etc.). The wheels 22 are driven to rotate by the engine, thereby facilitating movement of the vehicle across a field, for example.

In the illustrated embodiment, an air cart 26 is coupled to the agricultural implement 14 and is towed behind the agricultural implement 14 during operation and transport. In certain embodiments, the air cart 26 may be omitted, while in other embodiments the functionality of the air cart 26 may be integrated within the agricultural implement 14. Moreover, although a planting agricultural implement 14 is illustrated, any suitable equipment or implement may be coupled to the agricultural vehicle 12. For example, one or more of a planter, a seeder, a storage tank, a tillage implement, and so forth may be coupled to the agricultural vehicle 12.

The agricultural implement 14 includes a tool frame 28, and a ground engaging tool 30 coupled to the tool frame 28. The ground engaging tool 30 is configured to excavate a trench into the soil 32 to facilitate seed and/or fertilizer deposition. In the illustrated embodiment, the ground engaging tool 30 receives product (e.g., seed, fertilizer, etc.) from a product distribution header via a hose extending between the header and the ground engaging tool 30. Although only one ground engaging tool 30 is employed within the illustrated embodiment, it should be appreciated that the agricultural implement 14 may include additional ground engaging tools 30 in alternative embodiments to facilitate product delivery across a wide swath of soil 32. The agricultural implement 14 includes a hydraulic system 34 to raise the ground engaging tool 30 out of the soil 32, to lower the ground engaging tool 30 into the soil 32, and/or to change a depth of the ground engaging tool 30 in the soil 32. As illustrated, the agricultural implement 14 includes wheel assemblies 36 which contact the soil surface 32 and enable the agricultural implement 14 to be pulled by the agricultural vehicle 12.

While the air cart 26 is towed behind the agricultural implement 14 in the illustrated embodiment, it should be appreciated that the air cart 26 may be towed directly behind the agricultural vehicle 12 in alternative embodiments. For example, the air cart 26 may be coupled to the agricultural vehicle 12 by the hitch assembly 16, and the agricultural implement 14 may be towed behind the air cart 26. In further embodiments, the agricultural implement 14 and the air cart 26 may be part of a single unit that is towed behind the agricultural vehicle 12, or elements of a self-propelled vehicle configured to distribute product across a field.

In the illustrated embodiment, the air cart 26 includes a storage tank 38, a frame 40, wheels 42, a metering system 44, and an air source 46. The frame 28 includes a towing hitch configured to couple to the agricultural implement 14 or to the agricultural vehicle 12, thereby enabling the air cart 26 to be towed across a field. In certain configurations, the storage tank 38 includes multiple compartments for storing various flowable particulate materials. For example, one compartment may include seeds, and another compartment may include a dry/granular fertilizer. In such configurations, the air cart 26 may be configured to deliver both seed and fertilizer to the agricultural implement 14 via separate distribution systems, or as a mixture through a single distribution system. The seed and/or fertilizer within the storage tank 38 are gravity fed into the metering system 44, thereby enabling the metering system 44 to distribute a desired quantity of product to the ground engaging tools 30 of the agricultural implement 14.

The agricultural system 10 also includes a sensor 48 coupled to the hitch assembly 16 and configured to provide a signal indicative of a force applied to the hitch assembly 16 by the agricultural vehicle 12 and/or the agricultural implement 14. The sensor 48 may be any suitable type of sensor capable of measuring the force applied to the hitch assembly 16 by the agricultural vehicle 12 and/or the agricultural implement 14. For example, the sensor 48 may be a strain gauge, a load cell, and so forth. The sensor 48 may be coupled to any suitable portion of the hitch assembly 16, such as to a drawbar of the hitch assembly 16, to a drawbar attachment point (e.g., pin, bolt, etc.) of the hitch assembly 16, or to another location. In certain embodiments, the agricultural system 10 may include multiple sensors 48. For example, the agricultural system 10 may include a sensor for monitoring a sideways draft (e.g., side force, side movement, etc) of the agricultural vehicle 12 and/or the agricultural implement 14.

The agricultural system 10 also includes control circuitry 50 electrically coupled to the sensor 48 and configured to receive signals from the sensor 48 indicative of the force applied to the hitch assembly 16. As illustrated, the control circuitry 50 is onboard the agricultural vehicle 12; however, in other embodiments, the control circuitry 50 may be onboard the agricultural implement 14. During operation, the control circuitry 50 receives the sensed force from the sensor 48 and adjusts operational parameters based on the sensed force to improve performance of the agricultural vehicle 12. For example, the control circuitry 50 may be configured to select a parameter associated with operation of the agricultural vehicle 12 and/or the agricultural implement 14 based on the signal. Furthermore, the control circuitry 50 may be configured to determine if performance of the agricultural vehicle 12 and/or the agricultural implement 14 will be improved by adjusting the parameter. Moreover, the control circuitry 50 may be configured to control the parameter if performance of the agricultural vehicle 12 and/or the agricultural implement 14 will be improved.

In certain embodiments, controlling the parameter may include controlling a pulling force provided by the agricultural vehicle 12 (e.g., increasing engine speed, decreasing engine speed, changing a gear of a transmission, increasing engine braking, reducing engine braking, engaging a four wheel drive system, disengaging the four wheel drive system, increasing braking, reducing braking, etc.). Moreover, controlling the parameter may also include controlling a drag (e.g., rolling resistance, air resistance, resistance, draft, draft force, etc.) provided by the agricultural implement 14 (e.g., raising ground engaging tools 30 out of soil 32, lowering ground engaging tools 30 into soil 32, increasing braking, reducing braking, change position of the agricultural implement 14 using the hydraulic system 34, etc.).

Using the control circuitry 50, the operation of the agricultural vehicle 12 and/or the agricultural implement 14 may be adjusted based on the force sensed by the sensor 48. As such, the agricultural vehicle 12 may respond to changing loads placed on the agricultural vehicle 12, thereby improving efficiency. Moreover, by improving efficiency of the agricultural vehicle 12 and/or the agricultural implement 14, a cost of operating the agricultural vehicle 12 and/or the agricultural implement 14 may be reduced, and longevity of components of the agricultural vehicle 12 and/or the agricultural implement 14 may be increased.

FIG. 2 is a block diagram of an embodiment of the agricultural system 10 having the control circuitry 50 configured to improve performance of the agricultural vehicle 12 and/or the agricultural implement 14 while the agricultural vehicle 12 is towing the agricultural implement 14. As illustrated, the sensor 48 is coupled to a drawbar 52 (e.g., at an attachment point between the agricultural vehicle 12 and the agricultural implement 14, or another suitable location). Moreover, the sensor 48 is configured to detect a force applied to the hitch assembly 16 by the agricultural vehicle 12 and/or the agricultural implement 14. Furthermore, the sensor 48 is electrically coupled to the control circuitry 50 and is configured to provide a signal to the control circuitry 50 indicative of the force applied to the hitch assembly 16 by the agricultural vehicle 12 and/or the agricultural implement 14.

The control circuitry 50 includes at least one processor 54, at least one memory device 56, and at least one storage device 58. The processor 54 may execute instructions to analyze and process signals from the sensor 48, and to control parameters associated with the operation of the agricultural vehicle 12 and/or the agricultural implement 14. Moreover, the processor 54 may include one or more microprocessors, such as one or more "general-purpose" microprocessors, one or more special-purpose microprocessors, and/or application-specific integrated circuits (ASICS), or some combination thereof. For example, the processor 54 may include one or more reduced instruction set (RISC) processors.

The memory device 56 may include a volatile memory, such as random access memory (RAM), and/or a nonvolatile memory, such as read-only memory (ROM). The memory device 56 may store a variety of information that may be used for various purposes. For example, the memory device 56 may store processor-executable instructions (e.g., firmware or software) for the processor 54 to execute, such as instructions for analyzing and processing signals from the sensor 48, and instructions for controlling operation of the agricultural vehicle 12 and/or the agricultural implement 14. The storage device 58 (e.g., nonvolatile storage) of the presently illustrated embodiment may include ROM, flash memory, a hard drive, or any other suitable optical, magnetic, or solid-state storage medium, or a combination thereof. The storage device 58 may store data (e.g., sensor data), instructions (e.g., software or firmware to implement functions of the control circuitry 50), and any other suitable data.

Based on the data sensed by the sensor 48, the control circuitry 50 controls parameters associated with operation of the agricultural vehicle 12 and/or the agricultural implement 14. Specifically, the control circuitry 50 controls parameters associated with operation of an engine 60, a braking system 62, a four wheel drive system 64, a transmission 66, gears 68 of the transmission 66, a hydraulic system 70, and/or any other suitable system of the agricultural vehicle 12. For example, the control circuitry 50 may increase an engine speed, decrease the engine speed, increase an agricultural vehicle speed, decrease the agricultural vehicle speed, engage engine braking, disengage the engine braking, engage brakes of the braking system 62, disengage the brakes of the braking system 62, engage the four wheel drive system 64, disengage the four wheel drive system 64, switch gears 68 of the transmission 66, activate a component of the hydraulic system 70, deactivate a component of the hydraulic system 70, and so forth.

Moreover, the control circuitry 50 controls operation of the ground engaging tools 30, the hydraulic system 34, a braking system 72, and/or any other suitable system of the agricultural implement 14. For example, the control circuitry 50 may adjust a depth of the ground engaging tools 30, raise the ground engaging tools 30, lower the ground engaging tools 30, activate a component of the hydraulic system 34, deactivate a component of the hydraulic system 34, increase hydraulic fluid flow from the agricultural vehicle 12 to the agricultural implement 14, decrease the hydraulic fluid flow from the agricultural vehicle 12 to the agricultural implement 14, engage brakes of the braking system 72, disengage the brakes of the braking system 72, and so forth.

By receiving a signal indicative of the force applied by the agricultural implement 14 to the agricultural vehicle 12, the control circuitry 50 may select a parameter associated with operation of the agricultural vehicle 12 and/or the agricultural implement 14, based on the signal, and may determine if performance of the agricultural vehicle 12 and/or the agricultural implement 14 will be improved by adjusting the parameter. Furthermore, the control circuitry 50 may control the parameter with little or no human interaction, thus simplifying operation of the agricultural system 10. Moreover, the control circuitry 50 may use various algorithms to determine which parameters to adjust to operate with improved efficiency.

FIG. 3 is a flowchart of an embodiment of a method 74 for improving performance of the agricultural vehicle 12 and/or the agricultural implement 14 while the agricultural vehicle 12 is towing the agricultural implement 14. The method 74 includes sensing a force applied by the agricultural implement 14 to the hitch assembly 16 of the agricultural vehicle 12 using the sensor 48 (block 76). Based on the sensed force, the control circuitry 50 selects a parameter associated with operation of the agricultural vehicle 12 and/or the agricultural implement 14. In certain embodiments, selecting the parameter associated with operation of the agricultural vehicle 12 and/or the agricultural implement 14 includes receiving user input that includes operational requirements (e.g., a desired ground speed, a desired engine speed, a desired fuel efficiency, etc.). Moreover, in some embodiments, selecting the parameter associated with operation of the agricultural vehicle 12 and/or the agricultural implement 14 includes receiving operational requirements from the agricultural vehicle 12 and/or the agricultural implement 14. Specifically, the control circuitry 50 determines whether to apply brakes of the agricultural vehicle 12 and/or the agricultural implement 14 (block 78). If the control circuitry 50 determines that brakes of the agricultural vehicle 12 and/or the agricultural implement 14 should be applied, the control circuitry 50 determines whether performance of the agricultural vehicle 12 and/or the agricultural implement 14 will be improved by applying the brakes of the agricultural vehicle 12 and/or the agricultural implement 14 (block 80). Conversely, if the control circuitry 50 determines that brakes of the agricultural vehicle 12 and/or the agricultural implement 14 should not be applied, the control circuitry 50 determines whether to change the engine speed (e.g., using an engine controller, using governor like controls, accelerating, decelerating, etc.) (block 82). For example, the control circuitry 50 may determine to increase engine speed when the agricultural vehicle 12 is pulling the agricultural implement 14 uphill, and the control circuitry 50 may determine to decrease engine speed when the agricultural vehicle 12 is pulling the agricultural implement 14 downhill. Moreover, if changing the engine speed produces insufficient results, the control circuitry 50 may also change gears or select any suitable parameter to control. In certain embodiments, determining whether performance of the agricultural vehicle 12 and/or the agricultural implement 14 will be improved includes analyzing a history of the signal (e.g., how long the signal has been at a predetermined value, how often the signal has been at a predetermined value, etc.).

Moreover, the control circuitry 50 similarly determines whether to change gears 68 of the transmission 66 (block 84), whether to activate the four wheel drive system 64 (block 86), whether to adjust a depth of ground engaging tools 30 (block 88), and whether to adjust operation of the hydraulic system 34, 70 (block 90). Furthermore, the control circuitry 50 may determine whether to adjust any other parameters associated with operation of another system or component of the agricultural vehicle 12 and/or the agricultural implement 14. If the control circuitry 50 does not select any parameters associated with operation of the agricultural vehicle 12 and/or the agricultural implement 14 based on the sensed force, the control circuitry 50 returns to block 76. Furthermore, if the control circuitry 50 determines any parameter associated with operation of the agricultural vehicle 12 and/or the agricultural implement 14 based on the sensed force, the control circuitry 50 transitions to block 80.

If the control circuitry 50 determines that performance of the agricultural vehicle 12 and/or the agricultural implement 14 will be improved by adjusting the parameter, the control circuitry 50 controls the parameter (block 92). Furthermore, in some embodiments, the control circuitry 50 may be configured to prioritize controlling certain parameters before controlling other parameters. For example, the control circuitry 50 may be configured to control engine speed using a governor before changing gears of the engine. Moreover, the control circuitry 50 may be configured to control parameters in certain circumstances to override a manual function performed by an operator to improve performance of the agricultural vehicle 12 and/or the agricultural implement 14. After controlling the parameter, the control circuitry 50 returns to block 76.

In certain embodiments, determining if performance of the agricultural vehicle 12 and/or the agricultural implement 14 will be improved by adjusting the parameter includes determining a current fuel efficiency based on a current value of the parameter, adjusting the parameter to an adjusted value, determining a projected fuel efficiency based on the adjusted value of the parameter, and comparing the projected fuel efficiency to the current fuel efficiency. Furthermore, in certain embodiments, determining if performance of the agricultural vehicle 12 and/or the agricultural implement 14 will be improved by adjusting the parameter includes determining a current cost of operating the agricultural vehicle 12 and/or the agricultural implement 14 based on a current value of the parameter, adjusting the parameter to an adjusted value, determining a projected cost of operating the agricultural vehicle 12 and/or the agricultural implement 14 based on the adjusted value of the parameter, and comparing the projected cost of operating the agricultural vehicle 12 and/or the agricultural implement 14 to the current cost of operating the agricultural vehicle 12 and/or the agricultural implement 14.

In other embodiments, determining if performance of the agricultural vehicle 12 and/or the agricultural implement 14 will be improved by adjusting the parameter includes the control circuitry 50 receiving a desired fuel efficiency, a desired engine speed, a desired ground speed, and so forth, from the agricultural vehicle 12 and/or the agricultural implement 14.

By using the control circuitry 50, the operation of the agricultural vehicle 12 and/or the agricultural implement 14 may be adjusted based on the force sensed by the sensor 48 and with little or no human intervention. As such, the agricultural vehicle 12 may respond to changing loads placed on the agricultural vehicle 12, thereby improving efficiency. Moreover, by improving efficiency of the agricultural vehicle 12 and/or the agricultural implement 14, a cost of operating the agricultural vehicle 12 and/or the agricultural implement 14 may be reduced, and longevity of components of the agricultural vehicle 12 and/or the agricultural implement 14 may be increased.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
a hitch assembly configured to couple an agricultural vehicle with an agricultural implement;
a sensor coupled to the hitch assembly and configured to provide a signal indicative of a force applied to the hitch assembly by the agricultural vehicle, the agricultural implement, or some combination thereof; and
control circuitry configured to receive the signal from the sensor, to select one parameter from a plurality of parameters associated with operation of the agricultural vehicle, the agricultural implement, or some combination thereof, based at least in part on the signal, to determine if performance of the agricultural vehicle, the agricultural implement, or some combination thereof, will be improved by adjusting the one parameter selected from the plurality of parameters, and to control the one parameter selected from the plurality of parameters if performance of the agricultural vehicle, the agricultural implement, or some combination thereof, will be improved;
wherein the plurality of parameters comprises a speed of the agricultural vehicle, a speed of the agricultural implement, a braking force of the agricultural vehicle, a braking force of the agricultural implement, an engine speed of the agricultural vehicle, a depth of a ground engaging tool of the agricultural implement, a hydraulic force applied by a hydraulic system, a gear ratio of a transmission of the agricultural vehicle, or a combination thereof.

2. The agricultural system of claim 1, wherein the hitch assembly comprises a drawbar, and the sensor is coupled to the drawbar of the hitch assembly.

3. The agricultural system of claim 1, wherein the sensor comprises a strain gauge, a load cell, or some combination thereof.

4. An agricultural system comprising:
an agricultural vehicle comprising a hitch assembly configured to be coupled to an agricultural implement, a sensor coupled to the hitch assembly and configured to provide a signal indicative of a force applied to the hitch assembly by the agricultural implement, and control circuitry configured to receive the signal from the sensor;
wherein the control circuitry is configured to select one parameter from a plurality of parameters associated with operation of the agricultural vehicle, the agricultural implement, or some combination thereof, based at least in part on the signal, to determine if performance of the agricultural vehicle, the agricultural implement, or some combination thereof, will be improved by adjusting the one parameter selected from the plurality of parameters, and to control the one parameter selected from the plurality of parameters if performance of the agricultural vehicle, the agricultural implement, or some combination thereof, will be improved; and wherein the plurality of parameters comprises a speed of the agricultural vehicle, a speed of the agricultural implement, a braking force of the agricultural vehicle, a braking force of the agricultural implement, an engine speed of the agricultural vehicle, a depth of a ground engaging tool of the agricultural implement, a hydraulic force applied by a hydraulic system, a gear ratio of a transmission of the agricultural vehicle, or a combination thereof.

5. The agricultural system of claim 4, wherein the hitch assembly comprises a drawbar, and the sensor is coupled to the drawbar of the hitch assembly.

6. The agricultural system of claim 4, wherein the sensor comprises a strain gauge, a load cell, or some combination thereof.

7. A method for improving performance of an agricultural vehicle, comprising:

sensing a force applied by an agricultural implement to a hitch assembly of the agricultural vehicle using a sensor;

selecting one parameter from a plurality of parameters associated with operation of the agricultural vehicle, the agricultural implement, or some combination thereof, based at least in part on the sensed force and using control circuitry;

determining if performance of the agricultural vehicle, the agricultural implement, or some combination thereof, will be improved by adjusting the one parameter selected from the plurality of parameters using the control circuitry; and controlling the one parameter selected from the plurality of parameters using the control circuitry if performance of the agricultural vehicle, the agricultural implement, or some combination thereof, will be improved;

wherein the plurality of parameters comprises a speed of the agricultural vehicle, a speed of the agricultural implement, a braking force of the agricultural vehicle, a braking force of the agricultural implement, an engine speed of the agricultural vehicle, a depth of a ground engaging tool of the agricultural implement, a hydraulic force applied by a hydraulic system, a gear ratio of a transmission of the agricultural vehicle, or a combination thereof.

8. The method of claim 7, wherein determining if performance of the agricultural vehicle, the agricultural implement, or some combination thereof, will be improved by adjusting the one parameter selected from the plurality of parameters comprises determining a current fuel efficiency based on a current value of the selected parameter, adjusting the selected parameter to an adjusted value, determining a projected fuel efficiency based on the adjusted value of the selected parameter, and comparing the projected fuel efficiency to the current fuel efficiency.

9. The method of claim 7, wherein determining if performance of the agricultural vehicle, the agricultural implement, or some combination thereof, will be improved by adjusting the one parameter selected from the plurality of parameters comprises determining a current cost of operating the agricultural vehicle, the agricultural implement, or some combination thereof, based on a current value of the selected parameter, adjusting the selected parameter to an adjusted value, determining a projected cost of operating the agricultural vehicle, the agricultural implement, or some combination thereof, based on the adjusted value of the selected parameter, and comparing the projected cost of operating the agricultural vehicle, the agricultural implement, or some combination thereof, to the current cost of operating the agricultural vehicle, the agricultural implement, or some combination thereof.

10. The method of claim 7, wherein controlling the one parameter selected from the plurality of parameters comprises at least one of increasing the engine speed of the agricultural vehicle, decreasing the engine speed, increasing engine braking, reducing engine braking, engaging a four wheel drive system of the agricultural vehicle, disengaging the four wheel drive system, and changing the gear ratio of the transmission of the agricultural vehicle.

11. The method of claim 7, wherein controlling the one parameter selected from the plurality of parameters comprises at least one of raising the ground engaging tool of the agricultural implement, lowering the ground engaging tool, increasing braking of the agricultural implement, reducing braking of the agricultural implement, increasing hydraulic fluid flow to the agricultural implement, and decreasing hydraulic fluid flow to the agricultural implement.

* * * * *